(12) United States Patent
Liu

(10) Patent No.: US 12,231,926 B1
(45) Date of Patent: Feb. 18, 2025

(54) WIRELESS COMMUNICATION METHOD AND DEVICE THEREOF

(71) Applicant: TP-Link Systems Inc., Irvine, CA (US)

(72) Inventor: Bolun Liu, Chengdu (CN)

(73) Assignee: TP-Link Systems Inc., Irvine, CA (US)

( * ) Notice: Subject to any disclaimer, the term of this patent is extended or adjusted under 35 U.S.C. 154(b) by 0 days.

(21) Appl. No.: 18/805,464

(22) Filed: Aug. 14, 2024

(51) Int. Cl.
*H04W 48/18* (2009.01)
*H04W 24/04* (2009.01)

(52) U.S. Cl.
CPC .......... *H04W 24/04* (2013.01); *H04W 48/18* (2013.01)

(58) Field of Classification Search
CPC ..... H04W 48/18; H04W 84/12; H04W 36/06; H04W 72/23; H04W 72/51; H04L 5/0087; H04L 5/0037
See application file for complete search history.

(56) References Cited

U.S. PATENT DOCUMENTS

| | | | | |
|---|---|---|---|---|
| 11,096,120 B1* | 8/2021 | Martinovich | ......... | H04W 8/186 |
| 2009/0247094 A1* | 10/2009 | Sakoda | ............. | H04W 52/0216 |
| | | | | 455/78 |
| 2009/0323608 A1* | 12/2009 | Adachi | ............. | H04W 72/0453 |
| | | | | 370/329 |
| 2016/0066234 A1* | 3/2016 | Cho | .................... | H04W 36/302 |
| | | | | 370/331 |
| 2016/0286476 A1* | 9/2016 | Patil | ...................... | H04W 40/32 |
| 2018/0124785 A1* | 5/2018 | Taylor | .................... | H04W 48/20 |
| 2019/0320322 A1* | 10/2019 | Jayawardene | .......... | H04L 43/10 |
| 2022/0225152 A1* | 7/2022 | Schultz | ................. | H04W 72/51 |
| 2022/0264587 A1* | 8/2022 | Zhang | ................... | H04W 76/15 |

FOREIGN PATENT DOCUMENTS

| | | |
|---|---|---|
| CN | 104301891 A | 1/2015 |
| CN | 104853406 A | 8/2015 |
| CN | 107135529 A | 9/2017 |
| WO | 2023131674 A1 | 7/2023 |
| WO | 2023236216 A1 | 12/2023 |

* cited by examiner

*Primary Examiner* — Syed Ali
(74) *Attorney, Agent, or Firm* — Loeb & Loeb LLP

(57) ABSTRACT

The disclosure provides a method for wireless communication performed by an access point (AP), wherein the AP is wirelessly connected with one or more staions (STAs) on a first communication channel. The method includes: determining that a network configuration will be updated; transmitting a first message to the one or more STAs for requesting a transition from the first communication channel to a second communication channel; determining that the updating of the network configuration is completed, and transmitting a second message to the one or more STAs for requesting a transition from the second communication channel to the first communication channel, wherein the AP or a neighboring AP maintain wireless connection with the one or more STAs on the second communication channel during the updating of the network configuration.

13 Claims, 6 Drawing Sheets

WIRELESS COMMUNICATION METHOD AND DEVICE THEREOF

TECHNICAL FIELD

The disclosure relates to the technical field of wireless communication, in particular to a method for wireless communication performed by an AP, an electronic device, and computer-readable storage medium.

BACKGROUND

Wi-Fi, a wireless communication technology, is designed to provide connectivity in various environments. Large-scale supermarkets, malls, and various public spaces often offer WiFi services to the public, intensifying the importance of information security within these networks. To safeguard user information privacy, network managers can enhance security by periodically updating WiFi configuration, such as SSID, passwords, or other means of verifying that users are authorized. Those methods are equally applicable in the context of domestic WiFi usage, effectively strengthening the security of household user information and preventing unauthorized network access.

However, such configuration alterations can potentially lead to temporary user disconnection. This disconnection may persist for a relatively long time until the configuration takes effect, negatively impacting the user experience. Therefore, when implementing this security strategy, it is desirable to consider how to ensure information security while simultaneously minimizing the impact on user experience.

Hence, there is a need to propose improvements to existing Wi-Fi technology to achieve balance between network safety and user experience.

SUMMARY

According to an aspect of the present application, a method for wireless communication performed by AP is provided. The AP is wirelessly connected with one or more staions (STAs) on a first communication channel. The method may comprise: determining that a network configuration will be updated; transmitting a first message to the one or more STAs for requesting a transition from the first communication channel to a second communication channel; determining that the updating of the network configuration is completed, and transmitting a second message to the one or more STAs for requesting a transition from the second communication channel to the first communication channel, wherein the AP or a neighboring AP maintain wireless connection with the one or more STAs on the second communication channel during the updating of the network configuration.

According to another aspect of the present application, an AP for wireless communication is provided. The AP is wirelessly connected with one or more staions (STAs) on a first communication channel, the AP comprises: a memory; and one or more processors operatively coupled to the memory, the one or more processors configured to: determine that a network configuration will be updated; transmit a first message to the one or more STAs for requesting a transition from the first communication channel to a second communication channel; determine that the updating of the network configuration is completed, and transmit a second message to the one or more STAs for requesting a transition from the second communication channel to the first communication channel, wherein the AP or a neighboring AP maintain wireless connection with the one or more STAs on the second communication channel during the updating of the network configuration.

According to another aspect of the present application, a computer-readable storage medium, which has stored thereon computer programs which, when executed by the processor of an AP, wherein the AP is wirelessly connected with one or more staions (STAs) on a first communication channel, cause the processor to perform: determining that a network configuration will be updated; transmitting a first message to the one or more STAs for requesting a transition from the first communication channel to a second communication channel; determining that the updating of the network configuration is completed, and transmitting a second message to the one or more STAs for requesting a transition from the second communication channel to the first communication channel, wherein the AP or a neighboring AP maintain wireless connection with the one or more STAs on the second communication channel during the updating of the network configuration.

According to another aspect of present application, an electronic device is provided, which comprises: a processor, and a memory having stored there on computer programs which, when executed by the processor, cause the processor to perform the above method.

According to another aspect of present application, an electronic device is provided, which comprises: means for determining that a network configuration will be updated; means for transmitting a first message to the one or more STAs for requesting a transition from the first communication channel to a second communication channel; means for determining that the updating of the network configuration is completed, and means for transmitting a second message to the one or more STAs for requesting transition from the second communication channel to the first communication channel, wherein the AP or a neighboring AP maintain wireless connection with the one or more STAs on the second communication channel during the updating of the network configuration.

According to another aspect of present application, a method for wireless communication performed by STA is provided. The STA is wirelessly connected with an AP on a first communication channel. The method may comprise: receiving, from the AP, a first message for requesting a transition from the first communication channel to a second communication channel; roaming from the first communication channel to a second communication channel, and receiving, from the AP, a second message for requesting a transition from the second communication channel to the first communication channel, wherein the AP or a neighboring AP maintain wireless connection with the one or more STAs on the second communication channel during the updating of the network configuration.

According to another aspect of present application, an STA for wireless communication is provided. The STA is wirelessly connected with an AP on a first communication channel. The STA comprises: a memory; and one or more processors operatively coupled to the memory, the one or more processors configured to: receive, from the AP, a first message for requesting a transition from the first communication channel to a second communication channel; roam from the first communication channel to a second communication channel, and receive, from the AP, a second message for requesting a transition from the second communication channel to the first communication channel, wherein the AP or a neighboring AP maintain wireless connection with the one or more STAs on the second communication channel during the updating of the network configuration.

According to another aspect of the present application, a computer-readable storage medium, which has stored thereon computer programs which, when executed by the processor, cause the processor to perform: receiving, from the AP, a first message for requesting a transition from the first communication channel to a second communication channel; roaming from the first communication channel to a second communication channel, and receiving, from the AP, a second message for requesting a transition from the second communication channel to the first communication channel, wherein the AP or a neighboring AP maintain wireless connection with the one or more STAs on the second communication channel during the updating of the network configuration.

BRIEF DESCRIPTION OF THE DRAWINGS

In order to more clearly explain the embodiments of present application or the technical solution in the prior art, the drawings needed to be used in the description of the embodiments of present application or the prior art will be briefly introduced below. Obviously, the drawings in the following description are only some embodiments recorded in present application, and other drawings can be obtained according to these drawings of the embodiments of present application for those skilled in the art.

DETAILED DESCRIPTION

Figure 1:
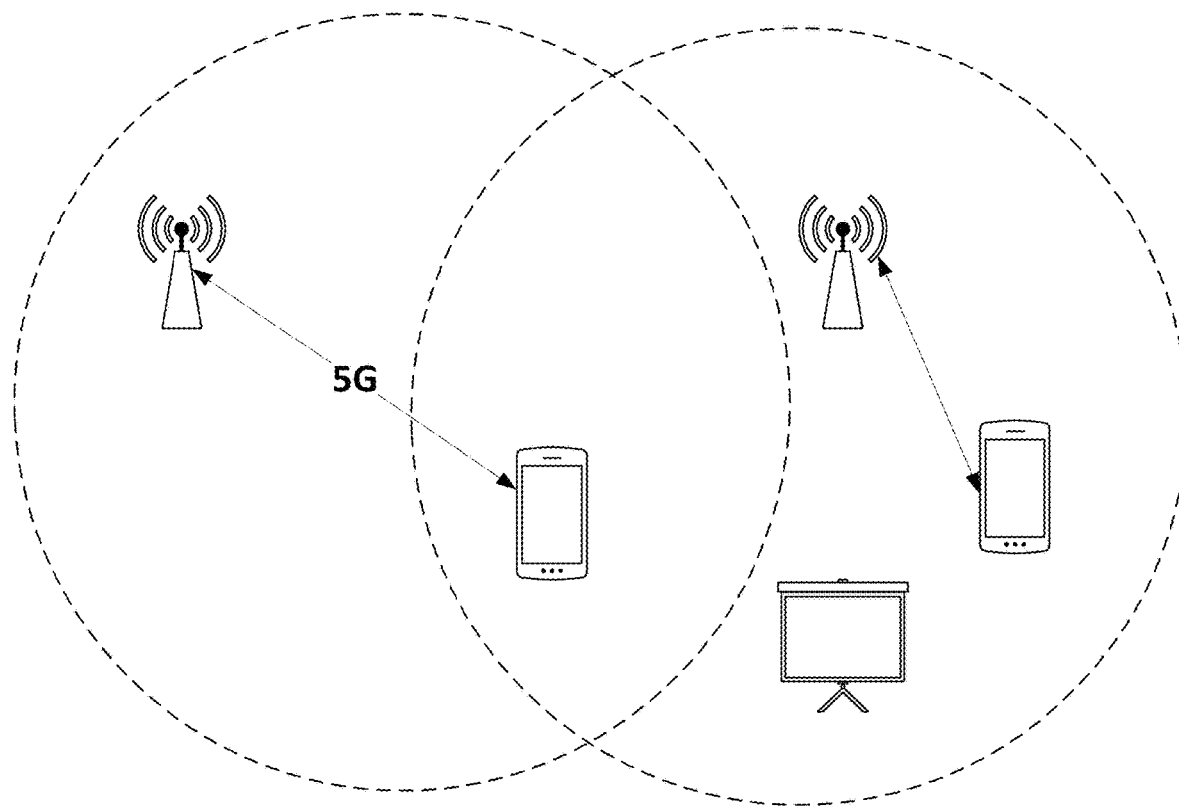
FIG. 1 illustrates a schematic diagram of a network system according to an embodiment of present application.

In order to provide a clearer and more complete description of the purpose, technical solution, and advantages of the present disclosure, the following description, in conjunction with the accompanying drawings, will provide a clear and comprehensive understanding of the technical solution in the present disclosure. It should be noted that the described embodiments are only a part of the embodiments disclosed herein, and not the entire embodiments. All other embodiments that ordinary skilled persons in the art can obtain without exercising inventive labor based on the embodiments disclosed herein are within the scope of the present disclosure.

The terms "first," "second," "third," "fourth," etc. (if present) used in the specification and claims, as well as in the accompanying drawings, are used to distinguish similar objects and are not necessarily used to describe a specific order or sequence. It should be understood that the use of such data can be interchangeable in appropriate circumstances, so that the embodiments of the present disclosure described herein can be implemented in an order other than that shown or described here.

It should be understood that the numbering of the processes in various embodiments of the present disclosure does not imply a specific order of execution. The execution order of the processes should be determined based on their functionality and inherent logic, and should not impose any limitations on the implementation process of the embodiments of the present disclosure.

It should be understood that the terms "comprising" and "having" and their variations intend to cover non-exclusive inclusion, such as a process, method, system, product, or apparatus that includes a series of steps or units, not necessarily limited to those explicitly listed, but may include other steps or units that are inherently present in these processes, methods, products, or apparatus.

It should be understood that the term "multiple" means two or more. The term "and/or" is merely a description of the associated relationship between related objects, indicating that there can be three possible relationships. For example, "A and/or B" can mean: A exists alone, A and B exist simultaneously, or B exists alone. The character "/" generally indicates an "or" relationship between the preceding and following related objects. "Including A, B, and C," "including A, B, C" means that A, B, and C are all included, and "including A, B, or C" means that one of A, B, and C is included. "Including A, B and/or C" means that any one or two or all three of A, B, and C are included.

It should be understood that "corresponding to B with A," "corresponding to A with B," "A corresponds to B," or "B corresponds to A" means that B is associated with A and can be determined based on A. Determining B based on A does not mean that B can only be determined based on A, but can also be determined based on A and/or other information. The matching of A and B means that the similarity between A and B is greater than or equal to a predetermined threshold.

Depending on the context, the term "if" used herein can be interpreted as "when" or "in response to determining" or "in response to detecting."

The following specific embodiments will provide a detailed description of the technical solution of the present disclosure. These specific embodiments can be combined with each other, and certain concepts or processes may not be reiterated in some embodiments if they are the same or similar. In order to provide a clearer understanding of the purpose, technical solution, and advantages of the present disclosure, the following description will be provided in conjunction with the accompanying drawings.

Wi-Fi, a wireless communication technology, is designed to to ensure connectivity in varied environments. To reinforce protection for user information privacy, both network managers and ordinary household users can bolster network security. This enhanced safety can be achieved by consistently updating Wi-Fi configurations, such as SSID, passwords, or other methods ensuring user authorization.

For example, one proposed method to enhance Wi-Fi security involves obscuring the Service Set Identifier (SSID) of Basic Service Set Privacy Enhancements-capable Access Points (BPE AP). In this approach, the Access Point (AP) maintains two types of SSIDs: the 'true' SSID, set by the owner of the AP, and the 'Over-The-Air' (OTA) SSID, calculated using Hash (SSID||IV||RN). Here, IV is a key derived from PSK or SAE password, and RN is a random number in Beacon/Probe Response. After modifying the RN, the AP calculates the OTA SSID and sends the corresponding RN to the BPE STA (Station) or BPE Client.

Then, the BPE Client uses the cached 'true' SSID, the derived IV, and RN received to compute an SSID, and checks whether it matches the OTA SSID received, thereby enhancing the network's security. Herein, the terms BPE Station (STA) and BPE Client are used interchangeably. The system of maintaining 'true' SSID and 'Over-The-Air' (OTA) SSID can also be applied not only to the BPE Stations but also to ordinary stations (STAs). The present disclosure is not limited thereto.

However, in such scenarios, when the SSID of the BPE AP, particularly the OTA SSID, undergoes changes, the BPE Clients connected to that BPE AP may face disconnections, negatively impacting the user experience. Although BPE clients are mandated to store the 'true' SSID, the existing mode, almost analogous to manually entering a Wi-Fi password, requires BPE clients to enter the 'true' SSID. This may bring inconvenience in larger public spaces such as malls, affecting user internet access. Additionally, whenever there are changes to the 'true' SSID, the BPE client (BPE STA) needs to update the newly changed 'true' SSID to reconnect successfully. Therefore, a balance is needed between maintaining security and ensuring a user-friendly experience.

Thus, the mechanisms of configuration information exchange in Wi-Fi systems require enhancement. This would serve dual purposes-augmenting the user experience by minimizing the duration of disconnection instances and ensuring there is no compromise on security.

The present disclosure provides a solution based on for example roaming technology to address the problem of client disconnection during SSID transitions or other configuration changes in Wi-Fi configuration, ensuring a consistent browsing experience for users in multi-user environments. This disclosure may utilize roaming technologies to rectify situation of disrupted connections during SSID transitions, thereby maintaining seamless internet access for all users.

Subsequently, a more comprehensive and detailed explanation of the present disclosure will be provided, duly illustrated with reference to FIGS. 1-6.

FIG. 1 illustrates a schematic diagram of a network system according to an embodiment of the present application.

As depicted in FIG. 1, the network system according to the embodiment comprises one or more Access Points (APs), optionally supporting Basic Service Set Privacy Enhancements (BPE) function, hence known as BPE APs. APs can interconnect with other APs to provide a broader network coverage. These APs further communicate with one or more clients. These clients can include a variety of devices like mobile phones, tablets, laptops, desktop computers, personal computers (PCs), smart speakers, projectors, smartwatches, among others. Clients that optionally support BPE functions are termed as BPE clients. The term 'client' can alternatively be referred to as 'STA (Station)'.

The AP and STA may also support the roaming function. This function is particularly useful in large networks ensuring consistent and seamless connection, especially when a device is mobile or the network is spread over a large area.

The present disclosure provides a solution to address the problem of client disconnection during SSID transitions or other changes in Wi-Fi configuration, ensuring a consistent browsing experience for users in multi-user environments. This disclosure may utilize roaming technologies to rectify situation of disrupted connections during SSID transitions, thereby maintaining seamless internet access for all users.

Figure 2:
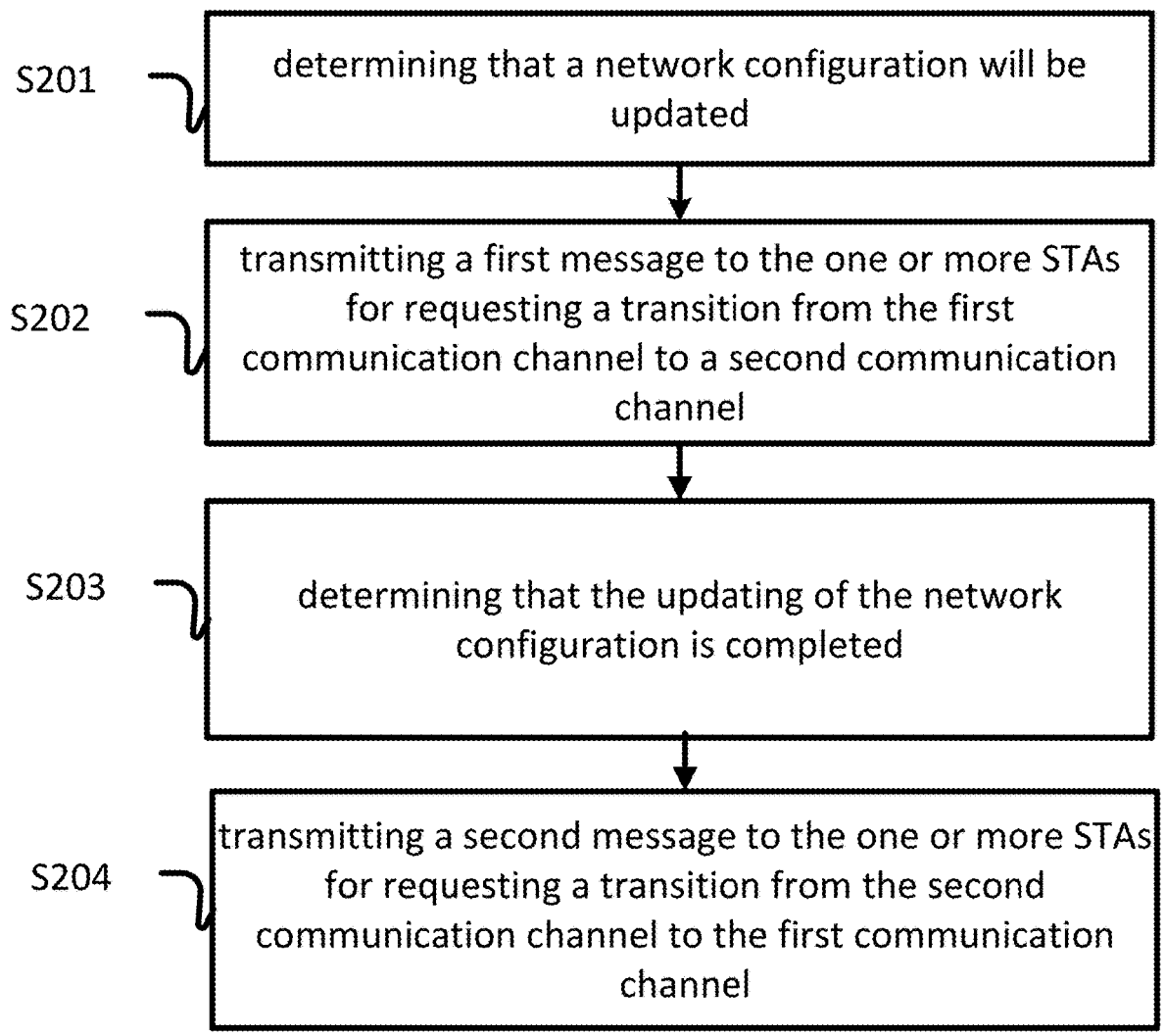
FIG. 2 illustrates a flowchart of the method for wireless communication performed by an AP according to an embodiment of the present application.

FIG. 2 illustrates a flowchart of method 20 for wireless communication performed by an AP according to an embodiment of the present application. The AP may include one or more processors and one or more memories. The memories store computer executable instructions. When these instructions are executed by the mentioned processor (s), method 20 can be executed.

The AP is wirelessly connected with one or more stations (STAs) on a first communication channel. The first communication channel can be carried on one of frequency bands of WiFi, such as 5G or 2.4G. In WiFi terms, 2.4 GHz and 5 GHz refer to the frequency bands where the AP operates. 2.4 GHz pertains to the wireless technology that supports the IEEE 802.11b standard protocol, with its frequency band ranging from 2.400 GHz to 2.4835 GHz. 5G WiFi, on the other hand, is the wireless technology developed based on the IEEE 802.11ac standard protocol, hence it's also called 5G WiFi. The AP is capable of concurrently supporting these two frequency bands. In addition, the AP could potentially operate on a greater range of frequency bands, such as the 6G. The present disclosure is not limited thereto.

The method for wireless communication performed by the AP can include step S201 to step S204.

At S201, the AP can determine that a network configuration will be updated.

Network configuration can refer to any form of configuration information within a communication network, specifically a network based on WiFi technology. Optionally, update of network configuration can refer to alteration of any WiFi-related information, which includes but not limited to OTA SSID, TRUE SSID, password, etc. The OTA SSID and/or the password may be periodically changed for security reasons, while the TRUE SSID could be manually altered by network administrators. In broad-scale environments such as supermarkets, the WiFi configuration information may also include various settings related to user registration. For example, when a user registers as a member of a supermarket or enters such a space, they may obtain access to the WiFi network associated with that location through the registration process, allowing the system to recognize and authenticate them.

Optionally, the AP can determine that a network configuration will be updated in a predefined period. The predefined period can be computed based on the timetable set by the network manager for the new TRUE SSID to become effective. For example, the network manager might specify a time for the new TRUE SSID to kick in. The AP will calculate how soon the new SSID will turn active and establish the time difference between the current time and the calculated one. If the difference is less than the predefined period, it is determined a network configuration will be updated within a predefined period. If the network manager has set the TRUE SSID to immediately take effect, it is determined that changes to the WiFi configuration will inevitably happen within the predefined period. The predefined future period can also be calculated based on the regular change time of the OTA SSID or password. The AP knows the change time of the OTA SSID or password, so the AP can set a timer whose time is set before the change time within the predefined future period, and then the timer directly triggers the execution of following steps. The present disclosure is not limited thereto.

Optionally, the predefined period is a relatively short time frame, as long as the predefined period ensures that the AP can complete the WiFi configuration update within that time frame and STAs can transition to another communication connection during that period. The present disclosure is not limited thereto.

At S202, the AP can transmits a first message to the one or more STAs for requesting a transition from the first communication channel to a second communication channel.

The first message, optionally employing roaming technology, serves as a type of message indicating the current AP's recommendation for associated STAs to switch to another communication channel. This recommendation is prompted by anticipated changes in the network conditions in the future. The first message may be transmitted via for example the first communication channel. The present disclosure is not limited thereto.

At present, the AP may have the capability to support BSS Transition. However, conventional BSS Transition involves STAs sending BSS Transition Management Queries to request a BSS Transition Candidate list, with the AP responding to STAs' BSS Transition Management Requests. The AP may include the BSS Transition Candidate List Entries field in the BSS Transition, which comprises one or more preferences for target communication channel candidates, such as the second communication channel.

One or more embodiments of the present disclosure introduce a mechanism similar to BSS Transition capability. This mechanism allows the AP to provide the first message to STAs when anticipating changes in network conditions. The first message may be similar to BSS Transition Management Requests, serving to alert the STA's user that the first communication channel is about to be disconnected, leading to the STA's disassociation from the first communication channel. The present disclosure is not limited thereto. Or, the first message may be similar to BSS Transition Management Query, offering transition preferences, including the second communication channel. The present disclosure is not limited thereto.

In an embodiment, the second communication channel may be one of a communication channel through another frequency band of the AP, a backup communication channel of the AP, or an available channel of another AP.

For example, if the AP and STA are communicating in the first communication channel through the 2.4 GHz band, then the second communication channel can be a channel through the 5 GHz band.

If the AP and STA are communicating through the 2.4G band, and either AP or STA only supports the 2.4G band, then the second communication channel could be a backup communication channel of the AP. A backup communication channel is a communication channel via a back interface. The backup interface can be used to temporarily communicate with the existing STAs when network configuration is updated. The backup interface operates on the same frequency band as a primary interface, and the primary interface is used for carrying communications on the first communication channel.

In the scenario where the AP is one of the multiple APs in a mesh network, the second communication channel may be any available channel of another AP within the mesh network.

After determining that the AP and one or more STAs can communicate via the second communication channel, the AP may start the update of the network configuration.

At S203, the AP can determine that the updating of the network configuration is completed. The AP or a neighboring AP maintain wireless connection with the one or more STAs on the second communication channel during the updating of the network configuration.

For example, a BPE AP may determine that it has already updated its TRUE SSID. Once this update is complete, and the internal instance associated with the TRUE SSID has been updated accordingly, the AP recognizes that the network configuration update is complete. As another example, assume the AP is set to calculate and update the OTA SSID at a predetermined time. In this case, when the AP finishes the calculation and the OTA SSID update has been implemented at the scheduled time, the AP determines that the network configuration update is completed.

Optionally, before the AP begins the updating of the network configuration, the AP may determine whether there are frames currently being transmitted on the first communication channel. If there is a frame currently being transmitted, the AP will not begin the updating until the transmission is finished to prevent any interruption or loss of data during the update process. Establishing a clear channel before making changes helps maintain the integrity of the ongoing communications and ensures a smooth transition during updates.

At S204, the AP can transmit a second message to the one or more STAs for requesting a transition from the second communication channel to the first communication channel.

Optionally, the second message can be transmitted through the second communication channel. Alternatively, the second message could also be broadcasted over a broadcast channel.

Optionally, the AP may include information related to the updated network configuration in the second message. This information may include various elements, such as the new TRUE SSID. In an OTA SSID change scenario, if the AP hasn't sent the new RN before the first message, the new RN could be involved in the second message. Alternatively, the second message could include a new password. The present disclosure is not limited thereto.

Optionally, method 20 may be carried out when one or more STAs are detected to be in an idle condition. This is to prevent any interruption in the user traffic and to ensure a seamless user experience for those connected to the network. By choosing to implement method 20 only when one or more STAs are idle, there's a minimal risk of disrupting ongoing data transmission for active users. Thus, this strategy aids in maintaining consistent and uninterrupted network performance, enhancing overall user satisfaction.

The present disclosure provides a method that effectively prevents disconnection issues of the client during the process of changing the SSID. By transitioning the first communication connection to the second communication connection, this ensures less interruption for the client. For a better user experience, upon completion of the change, the STA will be informed of the new network configuration. When using roaming, the STA can automatically roam back to the original connected frequency band, thus ensuring a seamless user experience. The method values the STA's connectivity and session maintenance, prioritizes user experience, and aims for efficient network management.

Next, some details of the AP 30 of the present disclosure will be described with reference to FIGS. 3 to 5. The AP 30 may be used to implement the method 20 according to an embodiment of the present disclosure. The present disclosure is not limited thereto.

Figure 3:
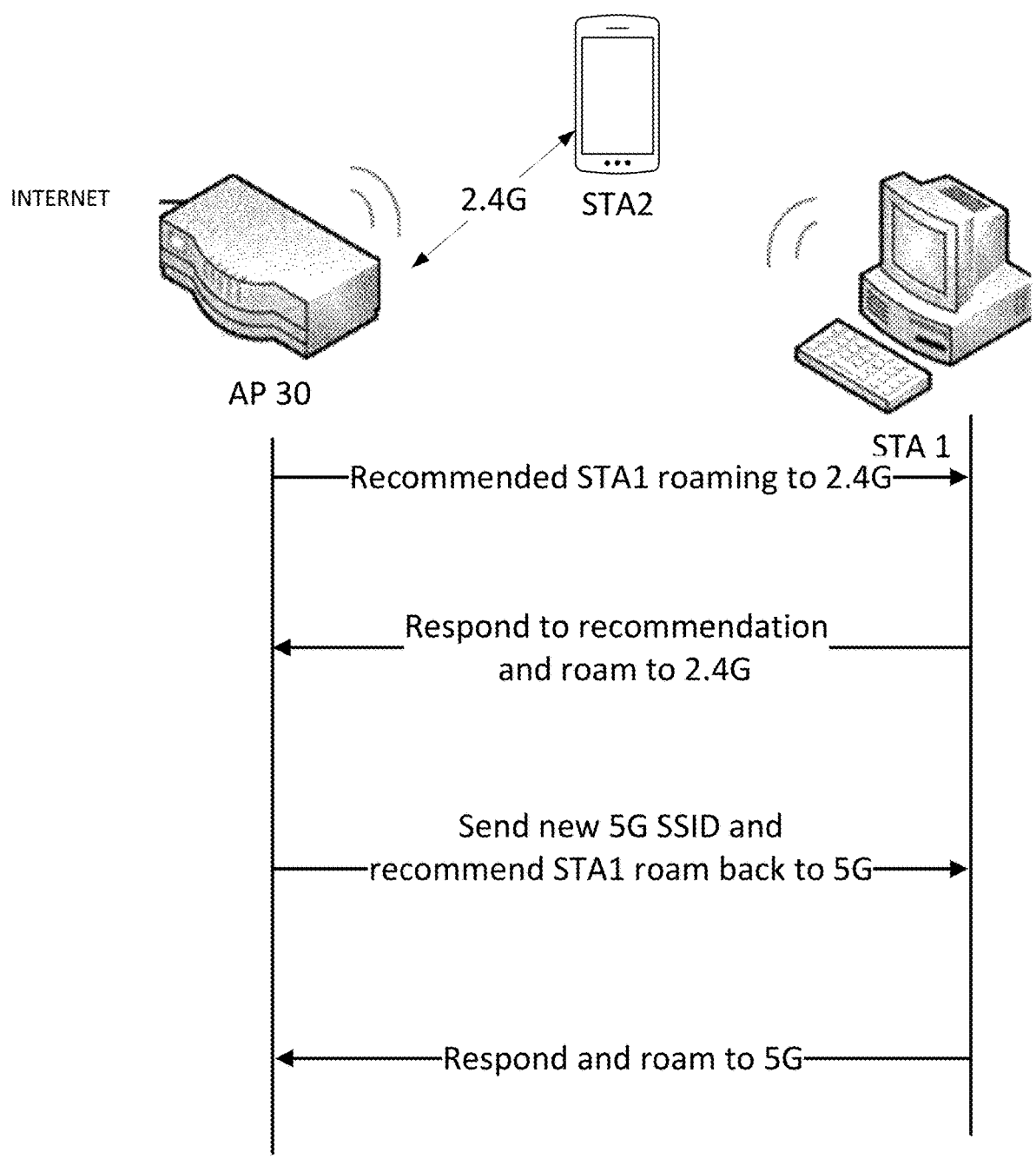
FIG. 3 illustrates a process flow of interaction among an AP and two STAs according to an embodiment of the present application.

FIG. 3 illustrates a process flow of interaction among an AP 30, STA1 and STA2 according to an embodiment of the present application.

Optionally, AP 30 can be a multi-band AP that operates on both 5G and 2.4G frequency bands. For instance, considering two STAs, STA1 and STA2, where one is connected to AP 30's 5G band (STA1) and the other to the 2.4G band (STA2). When AP 30 determines to change the network configuration of the 5G band (for example, the TRUE SSID of communication channel of AP 30) within a predefined period, it transmits a first message for transition from the first communication channel (5G band) to a second communication channel (2.4G band).

Assuming the all STA including STA1 connected to AP 30 also supports multi-band communication, to avoid affecting the user experience of STA1 connected to AP 30's 5G band, AP 30 transmits a first message requesting STA1 to roam to AP 30's 2.4G band. STA1 responds to the first message and roams to the 2.4G band.

However, STA1 still has the option to not respond to the first message and stay connected to the 5G band. For example, STA1 may send a response to the AP regarding the first message, explicitly refusing to switch to 2.4G. In this case, AP 30 may try disconnecting STA1 (for example, by not responding to any messages from STA1) from AP 30's 5G band for some time, encouraging STA1 to roam to 2.4G.

Once all STAs communicating on the first communication channel (5G) have successfully roamed to the second communication channel (2.4G) and it is determined that the updating of the network configuration is completed, the AP completes the change of the TRUE SSID of 5G band. Optionally, the AP may then broadcast a second message containing the new TRUE SSID to the recently roamed STA1 or send the new TRUE SSID via the second communication channel. After STA1 acknowledges the information, the AP sends a message containing another roam request, recommending it to roam back to the 5G band.

The method 20 can also be applied to changing the TRUE SSID on the 2.4G frequency band. It maintains the same principle and process of ensuring a seamless transition and reducing the risk of disconnection or data loss during the change.

Furthermore, if the AP 30 is able to operate on more bands, for example, a 6G band, the procedure to change the SSID for these supplementary bands would follow the previous steps. This disclosure is not limited to a specific setup or frequency band, promoting efficient network management across various network environments.

Figure 4:
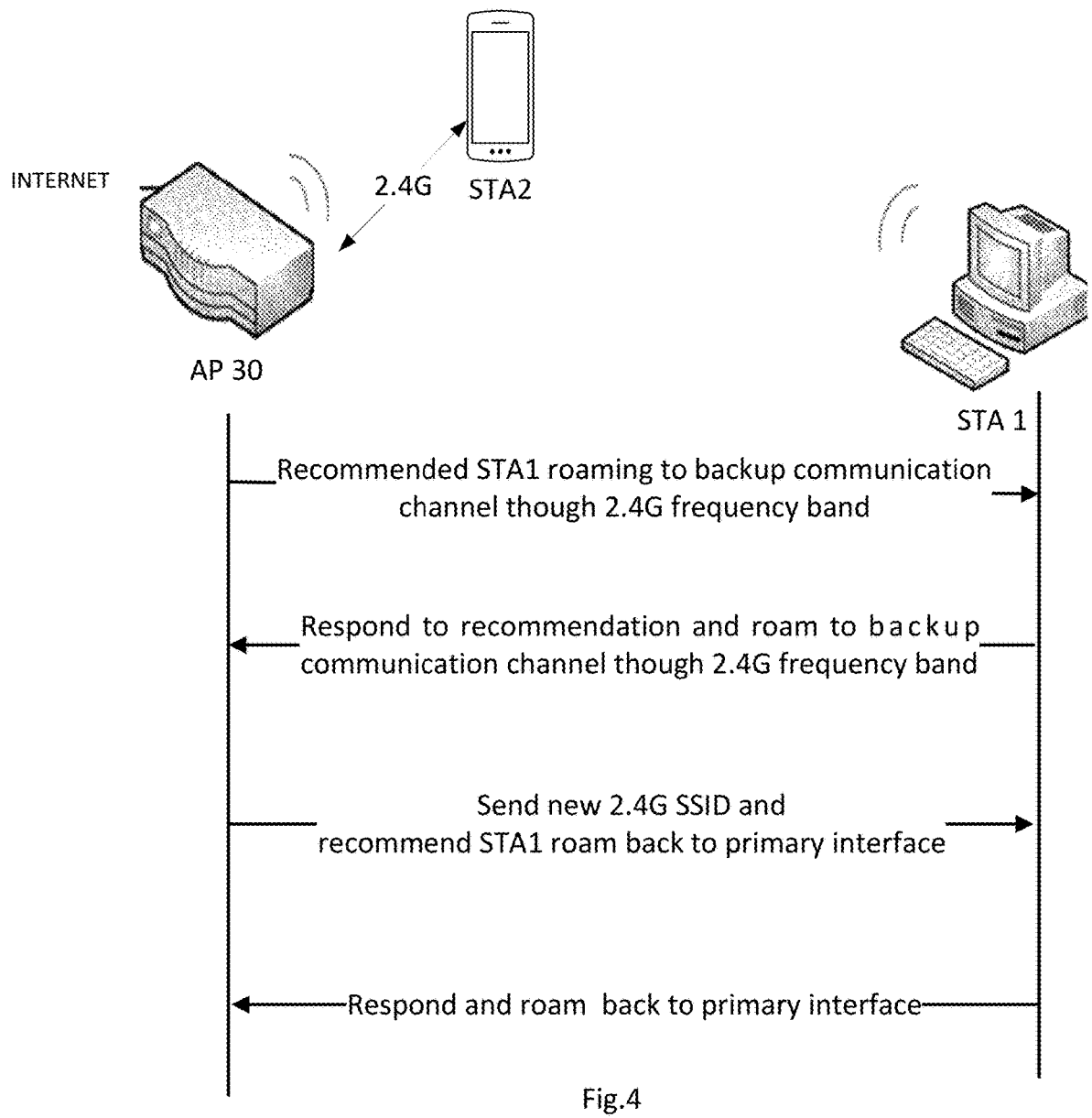
FIG. 4 illustrates a process flow of interaction among an AP and two STAs according to another embodiment of the present application.

FIG. 4 illustrates a process flow of interaction among AP 30, STA1, and STA2 according to another embodiment of the present application.

For an AP 30 that operates on a single frequency band (like only 2.4G), or cases where STA1 and STA2 are both detected to support only a single frequency band, a backup communication interface is introduced in the AP 30 network configuration before the change of SSID. This backup interface can be used to temporarily communicate with the existing STAs when network configuration is updated. Communication channel via the backup interface is also referred to as the backup communication channel.

Assuming the AP has set up two 2.4G interfaces (a primary interface and a backup interface) before determining the network configuration update. Both the primary interface and the backup interface are operating on the 2.4G frequency band. It is assumed that both STA1 and STA2 are connected to the AP's primary interface via the first communication channel.

When AP 30 determines to change the network configuration (for example, the TRUE SSID) of the 2.4G band within a predefined period, the AP 30 activates the backup interface. The AP 30 sends a first message to the STA1 and STA2, for a transition from the primary interface to the backup interface, via the primary interface.

After AP 30 has successfully changed the TRUE SSID, AP 30 can transmits a second message for transition from the second communication channel to the first communication channel using the backup interface. The STA1 and STA2 that is communicating via the backup interface will be roam back to the primary interface.

Figure 5:
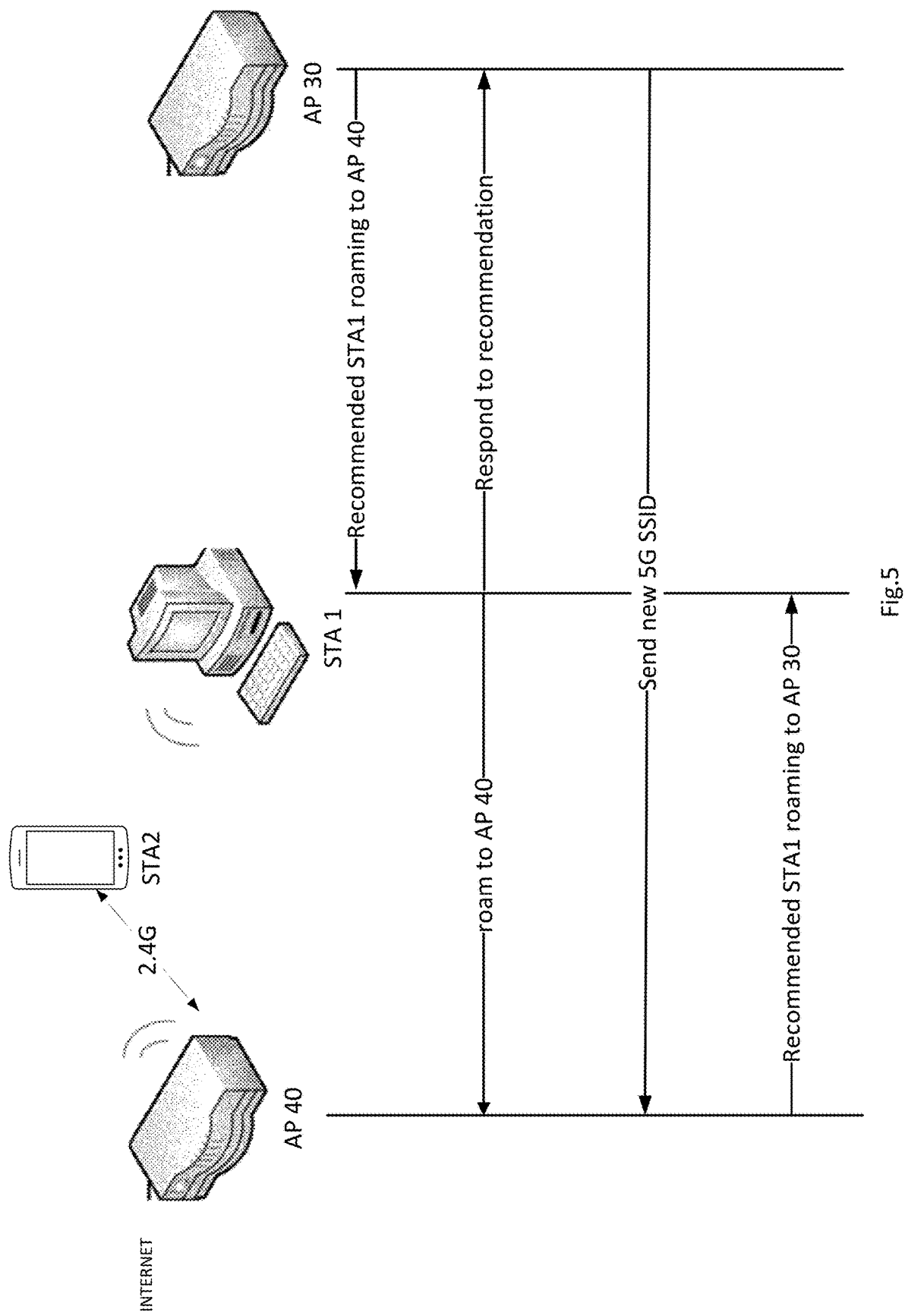
FIG. 5 illustrates a process flow of interaction among two APs and two STAs according to an another embodiment of the present application

FIG. 5 illustrates a process flow of interaction among an AP 30, AP 40, STA1 and STA2 according to an another embodiment of the present application.

AP 30 and AP 40 serve as units in the same mesh network. Currently, STA1 is maintaining communication with AP 30 through a first communication channel. In parallel, STA2 is also maintaining communication with AP 40 through a second communication channel.

When AP 30 decides to alter the TRUE SSID of its 5G or 2.4G bands within a predefined period, it dispatches a first message. This message is for transitioning from the first communication channel, which is the 5G band, to the second communication channel operated by AP 40. This transition helps in maintaining continuous communication even when changes are being made in the network.

Once STA1 roams to AP 40, AP 30 can simultaneously update the TRUE SSIDs for its multiple frequency bands, such as both 2.4G and 5G bands. AP 30 will send the updated network configuration to AP 40. AP 40 will transmit the updated network configuration of AP 30 to STA1 through the second communication channel, for example, the new TRUE SSID of AP 30. Of course, AP 30 can also directly broadcast that it has successfully completed the update of the SSID. It can then suggest STA1 roam back to AP 30 for better communication.

This capability results in time-saving, as adjustments across multiple bands can be performed in one go instead of one at a time. It is beneficial in a dynamic mesh network where various STAs and Access Points need to efficiently interact.

The present disclosure does not require additional frame management resource settings, saving resources and being widely applicable. This technology can be applied to existing multi-band APs and does not require extensive changes and ensures stability during connection transitions.

In addition to changing the TRUE SSID, this disclosure can be applied to other wireless configuration change processes. For example, if there is a need to change the channel information of the current frequency band, the embodiments of present disclosure may be utilized. The process may involve roaming the STA to one of another frequency band of the AP, a backup interface, or other networked AP), completing the corresponding wireless configuration change, then sending a second message to notify about the new information, and finally, roaming the original STA back to the original frequency band with the updated wireless configuration (channel), thus completing the entire wireless configuration modification process.

The present disclosure has a wide range of applications. For example, in large public places such as supermarkets, to ensure user information privacy, the AP can enhance network security by periodically changing its own SSID. The embodiments of present disclosure ensure that users currently using the network won't experience disconnections, thereby preserving a positive user experience. In a home setting, changing the SSID can also enhance user information security without affecting other members currently using the network. Additionally, this disclosure addresses potential issues with the existing TRUE SSID.

Figure 6:
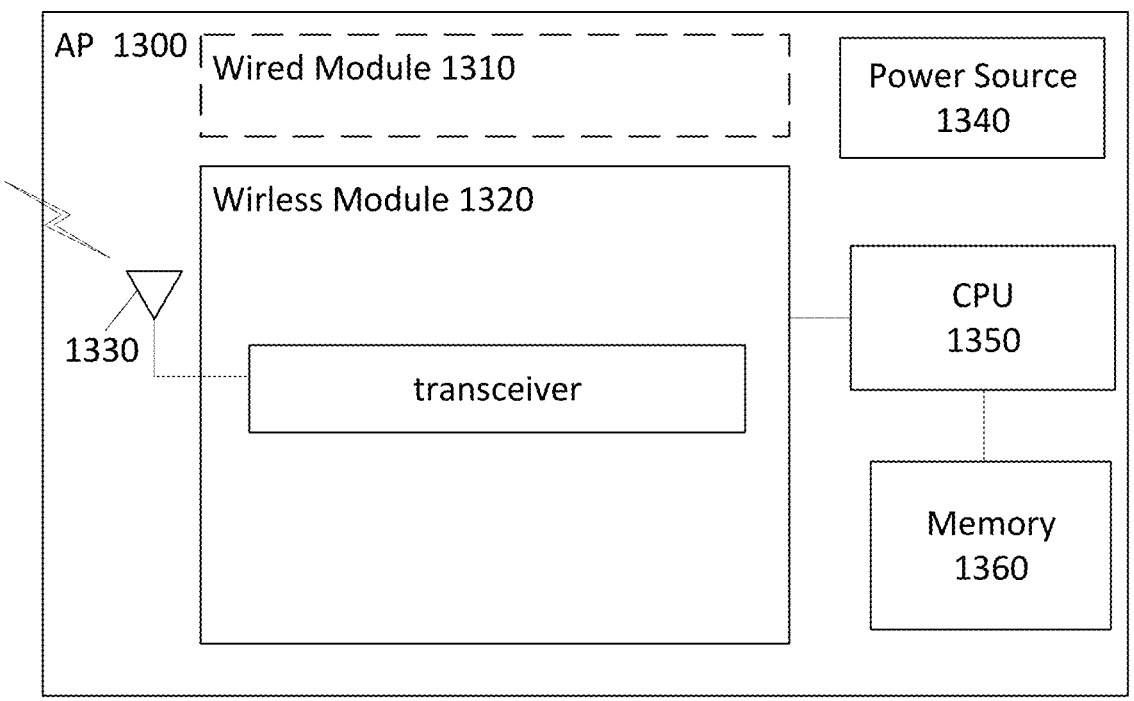
FIG. 6 shows an example configuration of a communication device, for example a gateway device, according to an embodiment of the present disclosure.

Further, FIG. 6 shows an example configuration of a communication device 1300, for example a gateway device, according to an embodiment of the present disclosure. The communication device 1300 may include a Wired circuit 1310 (optional), a Wireless circuit 1320, at least one antenna 1330 (for the sake of simplicity, only one antenna is shown in FIG. 7), a power source 1340, a central processing unit (CPU) 1350 and at least one memory 1360. The transceiver can be used to establish a link and transmit/receive signal over a channel of the link via the antenna 1330. The Wireless circuit 1320 and the CPU 1350 may function together as a circuit of the communication device 1300 configured to perform methods (e.g., method 20) as described in the present disclosure. It should be understood that the configuration of the communication device (e.g., AP 30) shown in FIG. 6 is merely as example, but not a limitation. The configuration of the communication device in the present disclosure can comprise more or less components than those in FIG. 6.

According to another aspect of the present disclosure, there is provided a computer-readable storage medium for storing a computer-readable program, the program causing a computer to perform the method for wireless communication as described above.

It is noted that one or more blocks (or operations) described with reference to FIG. 2 may be combined with one or more blocks (or operations) described with reference to another of the figures. For example, one or more blocks (or operations) of FIG. 2 may be combined with one or more blocks (or operations) of FIGS. 3-5. As another example, one or more blocks associated with FIGS. 3-5 may be combined with one or more blocks (or operations) associated with FIG. 2.

Techniques for wireless communication may include additional aspects, such as any single aspect or any combination of aspects described below and/or in connection with one or more other processes described elsewhere herein.

In a first aspect, An AP for wireless communication, wherein the AP is wirelessly connected with one or more staions (STAs) on a first communication channel, the AP comprising: a memory; and one or more processors operatively coupled to the memory, the one or more processors configured to: determine that a network configuration will be updated; transmit a first message to the one or more STAs for requesting a transition from the first communication channel to a second communication channel; determine that the updating of the network configuration is completed, and transmit a second message to the one or more STAs for requesting a transition from the second communication channel to the first communication channel, wherein the AP or a neighboring AP maintain wireless connection with the one or more STAs on the second communication channel during the updating of the network configuration.

In a second aspect, alone or in combination with any other aspect, wherein the second communication channel is one of another frequency band of the AP, a backup communication channel of the AP, or an available communication channel of another AP.

In a third aspect, alone or in combination with any other aspect, wherein the network configuration includes one or more of OTA SSID, TRUE SSID or password.

In a fourth aspect, alone or in combination with any other aspect, wherein when transmitting a first message to the one or more STAs for requesting a transition from the first communication channel to a second communication channel, the one or more processors configured to: in response to a first STA supporting multi-band communication, transmit the first message to the first STA, which indicates requesting for a transition from the first communication channel to another frequency band of the AP as the second communication channel; or in response to a second STA not supporting multi-band communication, transmit the first message to the second STA, which indicates requesting for a transition from the first communication channel to the backup communication channel of the AP as the second communication channel.

In a fifth aspect, alone or in combination with any other aspect, when transmitting a first message to the one or more STAs for requesting a transition from the first communication channel to a second communication channel, the one or more processors is configured to: in response to a neighboring AP being in the same mesh network as the AP, transmit the first message to the one or more STAs, which indicates requesting for a transition from the first communication channel to the available communication channel of the neighboring AP as the second communication channel.

In a sixth aspect, alone or in combination with any other aspect, wherein the one or more processors is further configured to: in response to determining that a third STA of the one or more STA refuses to transition from the first communication channel to a second communication channel, disconnect the third STA.

In an eighth aspect, alone or in combination with any other aspect, wherein the first message and the second message are roaming-based messages.

In a ninth aspect, alone or in combination with any other aspect, wherein the first message is transmitted via the first communication channel, and the second message is transmitted via the second communication channel or a broadcast channel.

In a tenth aspect, alone or in combination with any other aspect, a method for wireless communication performed by STA is provided. The STA is wirelessly connected with an AP on a first communication channel. The method may comprise: receiving, from the AP, a first message for requesting a transition from the first communication channel to a second communication channel; roaming from the first communication channel to a second communication channel, and receiving, from the AP, a second message for requesting a transition from the second communication channel to the first communication channel.

Those of skill would appreciate that the logical blocks, circuits, and algorithm steps described here may be implemented as electronic hardware, computer software, or a combination. This interchangeability of hardware and software is shown by the illustrative components described functionally. Whether the functionality is implemented in hardware or software depends on the application and constraints. Experts may implement the functionality in various ways for each application, but those choices do not depart from the scope here. Experts also recognize the examples of components, methods, and interactions here are merely illustrative; the components, methods, or interactions may be combined or performed differently.

The illustrative logic, blocks, circuits, and processes described may be implemented as hardware, software, or a combination. This hardware and software interchangeability has been described generally in terms of functionality and illustrated in the components, blocks, circuits, and processes. Whether the functionality is implemented in hardware or software depends on the application and constraints.

In an embodiment of the present disclosure, the processor may be a logic computing device with data processing capabilities and/or program execution capabilities, such as a central processing unit (CPU), a field programmable logic array (FPGA), a single chip microcomputer (MCU), a digital signal processor (DSP), an application specific integrated circuit (ASIC), or the like. The memory may be, for example, a volatile memory and/or a non-volatile memory. The volatile memory may include, for example, a random access memory (RAM) and/or a cache (Cache) or the like. The non-volatile memory may include, for example, a read only memory (ROM), a mechanical hard disk (HDD), a solid state drive (SSD), a flash memory (Flash), a USB flash drive, a memory card (SD, CF, MicroSD, etc.), and the like.

It will be appreciated by a person skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "data block", "circuit", "engine", "unit," "circuit," or "system". Furthermore, aspects of the present disclosure may take the form of a computer program product embodied in one or more computer-readable media having computer-readable program code embodied thereon.

Certain terminology has been used to describe embodiments of the present disclosure. For example, the terms "first/second embodiment", "one embodiment", "an embodiment", and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having the meaning that is consistent with their meaning in the context of the relevant art and will not be interpreted in an idealized or overly formal sense unless expressly so defined herein.

The above is illustration of the present disclosure and should not be construed as making limitation thereto. Although some exemplary embodiments of the present disclosure have been described, a person skilled in the art can easily understand that many modifications may be made to these exemplary embodiments without departing from the creative teaching and advantages of the present disclosure. Therefore, all such modifications are intended to be included within the scope of the present disclosure as defined by the appended claims. As will be appreciated, the above is to explain the present disclosure, it should not be constructed as limited to the specific embodiments disclosed, and modifications to the present disclosure and other embodiments are included in the scope of the attached claims. The present disclosure is defined by the claims and their equivalents.

What claimed is:

1. A method for wireless communication performed by an access point (AP), wherein the AP is wirelessly connected with one or more staions (STAs) on a first communication channel, the method comprising:
   determining that a network configuration will be updated;
   transmitting a first message to the one or more STAs for requesting a transition from the first communication channel to a second communication channel, wherein the second communication channel comprises one of another frequency band of the AP, a backup communication channel of the AP, or an available communication channel of another AP;
   determining that an updating of a network configuration is completed, and
   transmitting a second message to the one or more STAs for requesting a transition from the second communication channel to the first communication channel,
   wherein the AP or a neighboring AP maintains a wireless connection with the one or more STAs on the second communication channel during the updating of the network configuration,
   wherein the transmitting the first message to the one or more STAs for requesting the transition from the first communication channel to the second communication channel comprises, in response to the neighboring AP being in a mesh network as the AP, transmitting the first message to the one or more STAs for requesting a transition from the first communication channel to an available communication channel of the neighboring AP as the second communication channel.

2. The method according to claim 1, wherein the network configuration includes one or more of OTA SSID, TRUE SSID or password.

3. The method according to claim 1, wherein the transmitting the first message to the one or more STAs for transition from the first communication channel to the second communication channel comprises:
   in response to a first STA supporting multi-band communication, transmitting the first message to the first STA, which indicates requesting for a transition from the first communication channel to another frequency band of the AP as the second communication channel; or
   in response to a second STA not supporting multi-band communication, transmitting the first message to the second STA, which indicates a request for a transition from the first communication channel to the backup communication channel of the AP as the second communication channel.

4. The method according to claim 1, further comprising:
   in response to determining that a third STA of the one or more STA refuses to transition from the first communication channel to a second communication channel, disconnecting the third STA.

5. The method according to claim 1, wherein the first message and the second message are roaming-based messages.

6. The method according to claim 1, wherein the first message is transmitted via the first communication channel, and the second message are transmitted is the second communication channel or a broadcast channel.

7. An AP for wireless communication, wherein the AP is wirelessly connected with one or more staions (STAs) on a first communication channel, the AP comprising:
   a memory; and
   one or more processors operatively coupled to the memory, the one or more processors configured to:

determine that a network configuration will be updated;

transmit a first message to the one or more STAs for requesting a transition from the first communication channel to a second communication channel, wherein the second communication channel comprises one of another frequency band of the AP, a backup communication channel of the AP, or an available communication channel of another AP;

determine that an updating of a network configuration is completed, and transmit a second message to the one or more STAs for requesting a transition from the second communication channel to the first communication channel, wherein the AP or a neighboring AP maintains a wireless connection with the one or more STAs on the second communication channel during the updating of the network configuration;

wherein transmit the first message to the one or more STAs for requesting the transition from the first communication channel to the second communication channel, the one or more processors is configured to, in response to the neighboring AP being in a mesh network as the AP, transmit the first message to the one or more STAs for requesting a transition from the first communication channel to an available communication channel of the neighboring AP as the second communication channel.

8. The AP according to claim 7, wherein the network configuration includes one or more of OTA SSID, TRUE SSID or password.

9. The AP according to claim 7, wherein when transmitting the first message to the one or more STAs for transition from the first communication channel to the second communication channel, the one or more processors configured to:

in response to a first STA supporting multi-band communication, transmit the first message to the first STA, which indicates requesting for a transition from the first communication channel to another frequency band of the AP as the second communication channel; or in response to a second STA not supporting multi-band communication, transmit the first message to the second STA, which indicates requesting for a transition from the first communication channel to the backup communication channel of the AP as the second communication channel.

10. The AP according to claim 7, wherein the one or more processors is further configured to:

in response to determining that a third STA of the one or more STA refuses to transition from the first communication channel to a second communication channel, disconnect the third STA.

11. The AP according to claim 7, wherein the first message and the second message are roaming-based messages.

12. The AP according to claim 7, wherein the first message is transmitted via the first communication channel, and the second message is transmitted via the second communication channel or a broadcast channel.

13. A non-transitory computer-readable storage medium, which has stored thereon computer programs which, when executed by the processor of an AP, wherein the AP is wirelessly connected with one or more staions (STAs) on a first communication channel, cause the processor of the AP to perform:

determining that a network configuration will be updated;

transmitting a first message to the one or more STAs for requesting a transition from the first communication channel to a second communication channel, wherein the second communication channel comprises one of another frequency band of the AP, a backup communication channel of the AP, or an available communication channel of another AP;

determining that an updating of a network configuration is completed, and transmitting a second message to the one or more STAs for requesting a transition from the second communication channel to the first communication channel, wherein the AP or a neighboring AP maintains a wireless connection with the one or more STAs on the second communication channel during the updating of the network configuration, wherein the transmitting the first message to the one or more STAs for requesting the transition from the first communication channel to the second communication channel comprises, in response to the neighboring AP being in a mesh network as the AP, transmitting the first message to the one or more STAs for requesting the transition from the first communication channel to an available communication channel of the neighboring AP as the second communication channel.

* * * * *